United States Patent
Yoo

(10) Patent No.: US 11,511,580 B2
(45) Date of Patent: Nov. 29, 2022

(54) SUSPENSION FOR VEHICLE

(71) Applicants: Hyundai Motor Company, Seoul (KR); Kia Corporation, Seoul (KR)

(72) Inventor: Sang Hoon Yoo, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/473,397

(22) Filed: Sep. 13, 2021

(65) Prior Publication Data

US 2022/0288986 A1   Sep. 15, 2022

(30) Foreign Application Priority Data

Mar. 11, 2021  (KR) .......................... 10-2021-0032253

(51) Int. Cl.
*B60G 3/06* (2006.01)
(52) U.S. Cl.
CPC ............ *B60G 3/06* (2013.01); *B60G 2202/12* (2013.01); *B60G 2204/1244* (2013.01)
(58) Field of Classification Search
CPC .................. B60G 3/06; B60G 2202/12; B60G 2204/1244; B60G 11/16; B60G 2206/10; B60G 2204/124
See application file for complete search history.

(56) References Cited

U.S. PATENT DOCUMENTS

| | | | | |
|---|---|---|---|---|
| 1,777,565 A | | 10/1930 | Albert | |
| 2,507,980 A | * | 5/1950 | Knapp | B60G 11/14 267/248 |
| 2,839,293 A | * | 6/1958 | Cover | B60G 11/50 267/274 |
| 3,333,653 A | * | 8/1967 | Eirhart, Jr. | B60G 15/06 180/359 |
| 3,767,181 A | | 10/1973 | Van et al. | |
| 4,170,373 A | * | 10/1979 | Beck | B60G 7/001 280/124.141 |
| 4,456,282 A | * | 6/1984 | Rumpel | B60G 3/202 280/124.132 |
| 5,409,254 A | * | 4/1995 | Minor | B60G 21/051 280/124.179 |
| 2003/0116935 A1 | * | 6/2003 | Zadok | B60G 11/16 280/124.106 |

(Continued)

FOREIGN PATENT DOCUMENTS

EP    0642939 A1 *  3/1995
FR    2100284 A5    3/1972

(Continued)

OTHER PUBLICATIONS

Extended European Search Report for European Application No. 21196759.1, dated Mar. 4, 2022, 8 pages.

*Primary Examiner* — Paul N Dickson
*Assistant Examiner* — Kurtis Nielson
(74) *Attorney, Agent, or Firm* — Fox Rothschild LLP

(57) ABSTRACT

A suspension for a vehicle is configured such that, even in a situation of departing from a range in which a spring may be tensioned as a rebound state is added in a full rebound state, a lower end of the spring is continuously supported by a spring seat support arm, so as to prevent separation of the spring connecting a suspension arm to a body member.

6 Claims, 4 Drawing Sheets

(56) References Cited

U.S. PATENT DOCUMENTS

| | | | | |
|---|---|---|---|---|
| 2005/0184481 A1* | 8/2005 | Tanaka | ................... | B60G 11/16 |
| | | | | 280/124.17 |
| 2006/0220338 A1* | 10/2006 | Orimoto | ................. | B60G 3/20 |
| | | | | 280/124.179 |
| 2014/0291951 A1* | 10/2014 | Zandbergen | ........... | B60G 7/008 |
| | | | | 280/79 |
| 2020/0247204 A1* | 8/2020 | Fortmeier | .............. | B60G 7/001 |

FOREIGN PATENT DOCUMENTS

| | | | | |
|---|---|---|---|---|
| JP | 2004216922 | A | | 8/2004 |
| KR | 100527711 | B1 | * | 11/2005 |
| KR | 20080029164 | A | * | 4/2008 |
| KR | 2008-0052760 | A | | 6/2008 |
| KR | 100264649 | B1 | * | 9/2009 |
| KR | 20170060423 | A | * | 6/2017 |

* cited by examiner

US 11,511,580 B2

SUSPENSION FOR VEHICLE

CROSS REFERENCE TO RELATED APPLICATION

The present application claims under 35 U.S.C. § 119(a) the benefit of Korean Patent Application No. 10-2021-0032253, filed Mar. 11, 2021, the entire contents of which are incorporated by reference herein.

BACKGROUND

(a) Technical Field

The present disclosure relates generally to a suspension for a vehicle, more particularly, to the suspension having a structure capable of preventing separation of a spring connecting a suspension arm to a body member when a rebound state is added in a full rebound state during driving.

(b) Description of the Related Art

In a recent trend, tuning a vehicle hard has increased on the basis of European vehicles having excellent handling performance, and reduction of vehicle weight has been carried out to meet eco-friendly requirements.

In order to tune a vehicle hard, wheel rate, i.e., hardness supporting a tire during applying vertical load to the tire, should be high, and in order to increase the wheel rate, hardness of a spring connecting a suspension arm to a body member should increase.

When a weight of the vehicle is lightened, force compressing the spring is reduced and thereby the amount of compression of the spring is reduced.

As described above, in a state in which the hardness of the spring increases in order to satisfy the vehicle property of being hard, when the weight of the vehicle is lightened in order to satisfy a property of the eco-friendly vehicle, the amount of the compression of the spring is further reduced when the vertical load is applied to the tire. As a result, when a rebound state is added in a full rebound state during driving (corresponding to state of departing from a range in which the spring may be tensioned, a state of departing from freedom height of the spring, and a state in which the tire passes through a deep puddle), there is a problem that the spring connecting the suspension arm to the body member may be separated, which may result in occurrence of an accident such as a vehicle rollover.

In order to prevent separation of the spring, wheel stroke of the vehicle should be reduced, and the wheel stroke is a main factor affecting the vehicle performance and merchantability, but it is difficult to change the wheel stroke.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a suspension for a vehicle, the suspension being configured to prevent separation of a spring connecting a suspension arm to a body member, even in a situation of departing from a range (spring freedom height) in which a spring may be tensioned, that is, a situation in which a rebound state is added in a full rebound state during driving, so that stability of the vehicle may be improved.

In order to achieve the above objective, the suspension for a vehicle of the present disclosure includes: a spring seat support arm provided at a suspension arm connecting a body frame to a knuckle; and a spring configured to be supported, at opposite ends of the spring, by a body member and the spring seat support arm, the body member being located above the suspension arm.

The spring seat support arm may be arranged along a longitudinal direction of the suspension arm and configured to have a shape of a cantilever such that a first end of the spring seat support arm may be coupled to the suspension arm and the spring may be supported by a second end of the spring seat support arm, the second end of the spring seat support arm corresponding to a free end of the cantilever.

The spring seat support arm may include: a coupled portion integrally coupled to a first end of the suspension arm; a rod portion extending from the coupled portion along a longitudinal direction of the suspension arm and configured to be elastically deformed in response to external force; and a seat portion provided at an end of the rod portion and configured to support a lower end of the spring.

The suspension for a vehicle may include: a spring pad coupled to the seat portion and configured to be in contact with the lower end of the spring.

The spring seat support arm may include a protrusion portion formed to protrude outward from the coupled portion, wherein, when rebound is added in a full rebound state, as the protrusion portion is brought into contact with the body frame, the spring seat support arm may be restrained to be fixed.

The suspension for a vehicle may include: a stopper securely provided at a portion, the portion facing the protrusion portion, of the body frame, wherein, when the protrusion portion and the stopper are brought into contact with each other, the spring seat support arm may be restrained to be fixed.

The stopper may be a pad made of an elastic material in order to achieve impact absorption and noise prevention during the contact between the protrusion portion and the stopper.

The seat portion may be configured such that, in a normal full rebound state without departing from a spring freedom height, the seat portion may support the lower end of the spring while being in contact with a lower end of the suspension arm by spring force; and when rebound is added in the full rebound state, the protrusion portion may be brought into contact with the stopper so that the spring seat support arm may be restrained to be fixed, and when the spring seat support arm is restrained, the seat portion may be moved upward by elasticity of the rod portion to continuously support the lower end of the spring, and thereby preventing separation of the spring.

In the suspension of the present disclosure, even in a situation of departing from a range (spring freedom height) in which the spring may be tensioned as a rebound state is added in a full rebound state, the lower end of the spring is continuously supported by the spring seat support arm, so separation of the spring connecting the suspension arm to the body member can be prevented. Accordingly, occurrence of safety accidents such as a vehicle rollover accident can be prevented, and with improvement of vehicle stability, improvement of merchantability can be induced.

The present disclosure is configured to prevent the separation of a rear wheel spring during the full rebound in a vehicle having a high wheel rate, such as tuning where handling is a priority and a high performance vehicle, so there are advantages that round stroke can be further secured and excellent ride comport can be secured by improving shock on impact even in a high performance vehicle.

The present disclosure is configured such that the lower end of the spring is physically supported using the spring seat support arm at a time when the vehicle reaches the full rebound state so as to prevent the separation of the spring. Accordingly, with the structure not affecting hardness of the spring during driving operation, the suspension can be used without having the sense of difference.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 4A to 4C are views showing operation states of the suspension according to the present disclosure, wherein FIG. 4A shows a tolerance state, FIG. 4B shows a full rebound state, and FIG. 4C shows a state in which a rebound state is added in the full rebound state.

DETAILED DESCRIPTION OF THE DISCLOSURE

Figure 1:
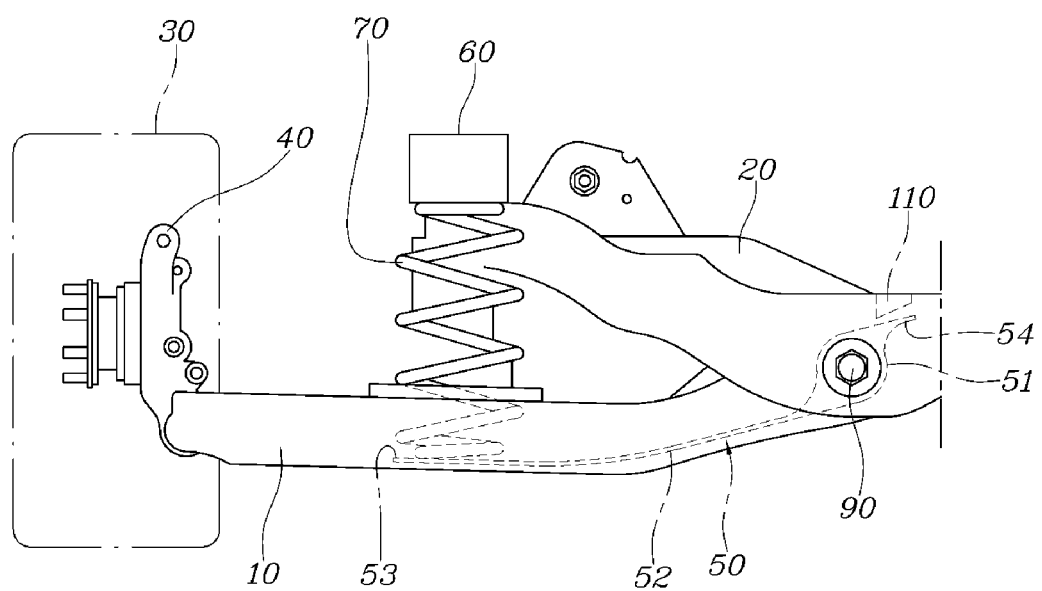
FIG. 1 is a view showing a suspension for a vehicle having a spring seat support arm according to the present disclosure.
Figure 2:
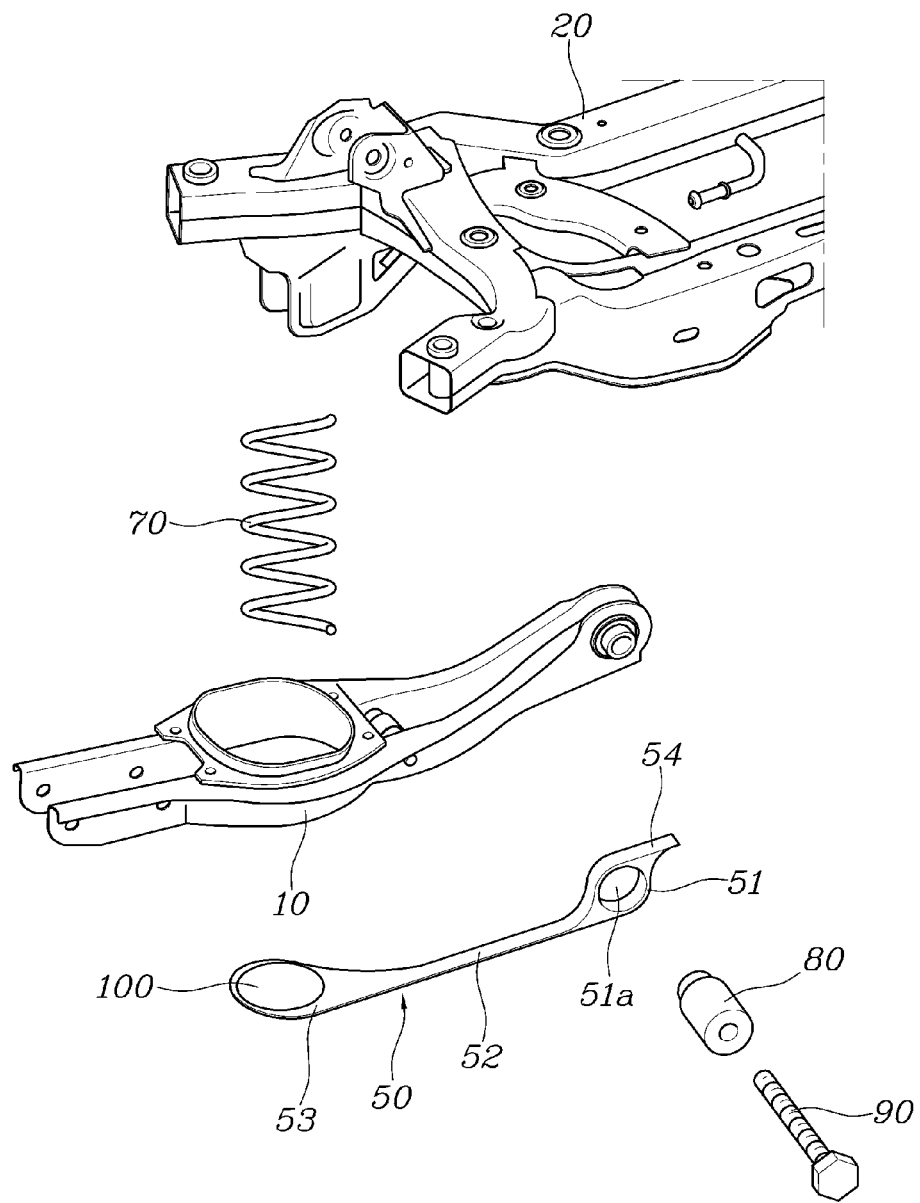
FIG. 2 is a disassembled view of FIG. 1.
Figure 3:
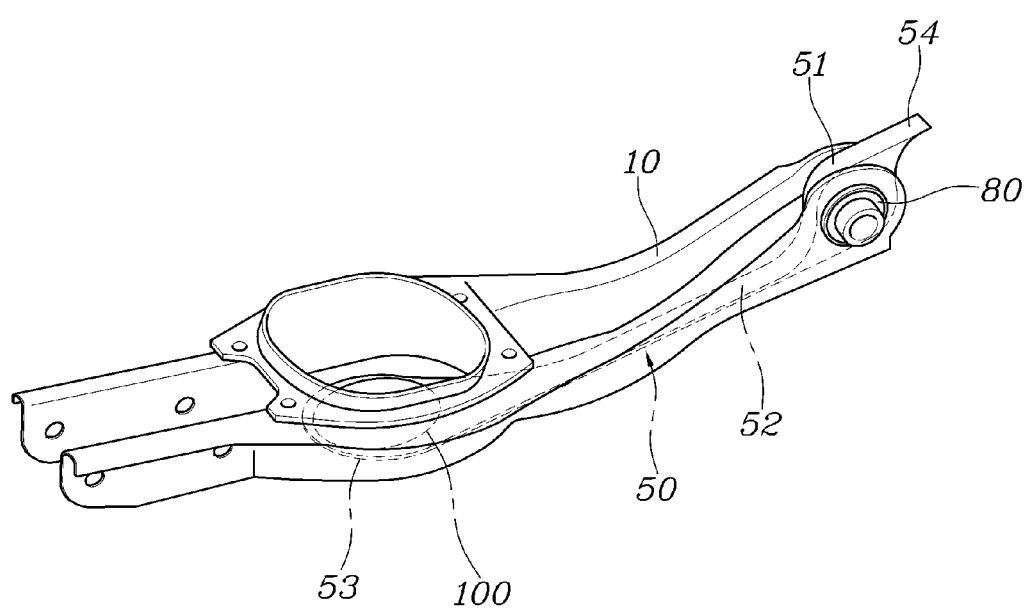
FIG. 3 is a view showing the spring seat support arm coupled to a suspension arm according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiment, so it should be understood that the present disclosure may be variously embodied, without being limited to the exemplary embodiments.

An embodiment described herein may be changed in various ways and various shapes, so specific embodiments are shown in the drawings and will be described in detail in this specification. However, it should be understood that the exemplary embodiment according to the concept of the present disclosure is not limited to the embodiment which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present disclosure. Singular forms are intended to include plural forms unless the context clearly indicates otherwise.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control part (controller) according to the exemplary embodiment of the present disclosure may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. The processor may take one or more form Hereinbelow, a suspension for a vehicle according to an exemplary embodiment of the present disclosure will be described with reference to accompanying drawings.

In FIGS. 1-3 and 4A-4C, an example of a multi-link type rear suspension for describing the present disclosure is shown.

As shown in FIGS. 1-3 and 4A-4C, according to the present disclosure, the suspension for a vehicle is configured such that a first end of a suspension arm 10 is connected to a body frame 20 and a second end of the suspension arm 10 is connected to a knuckle 40 of a tire 30.

The suspension arm 10 is a rear lower arm and the body frame 20 is a rear cross member.

The present disclosure includes: a spring seat support arm 50 provided at the suspension arm 10 connecting the body frame 20 to the knuckle 40; a body member 60 positioned above the suspension arm 10; and a spring 70 configured to be supported, at opposite ends of the spring 70, by the spring seat support arm 50.

The body member 60 preferably is a side member.

The spring seat support arm 50 has a structure covered up by the suspension arm 10 and arranged along a longitudinal direction of the suspension arm 10.

The spring seat support arm 50 is configured to be formed in a cantilever such that a first end of the spring seat support arm 50 is coupled to the suspension arm 10, and the spring 70 is supported by a second end of the spring seat support arm 50, the second end corresponding to a free end of the cantilever.

That is, the spring seat support arm 50 includes: a coupled portion 51 integrally coupled to the first end of the suspension arm 10; a rod portion 52 extending from the coupled portion 51 along the longitudinal direction of the suspension arm 10 and configured to be elastically deformed in response to external force; and a seat portion 53 provided at an end of the rod portion 52 and configured to support a lower end of the spring 70.

The coupled portion 51 of the spring seat support atm 50 has a circular through hole 51a, and a suspension arm bush 80 is coupled to the through hole 51a by being forcibly inserted.

A bolt 90 is fastened with a form of passing through the first end of the suspension arm 10, the suspension arm bush 80, and the body frame 20. Accordingly, the coupled portion 51 of the spring seat support arm 50 to which the suspension arm bush 80 is coupled is integrally coupled to the first end of the suspension arm 10 and is also coupled to the body frame 20 by the bolt 90.

The spring seat support arm 50 is configured such that a spring pad 100 is coupled to an upper surface of the seat portion 53 and a lower end of the spring 70 is in contact with the spring pad 100.

The spring pad 100 is preferably made of rubber or a material having elasticity in order to achieve impact absorption and noise prevention, but the present disclosure is not limited thereto. The spring seat support arm 50 includes a protrusion portion 54 formed to protrude outward from the coupled portion 51.

When a rebound state is added in a full rebound state during driving, the protrusion portion 54 is rotatably moved toward the body frame 20 to be brought into contact with the body frame 20, and at this time, the spring seat support arm 50 is restrained to be fixed.

According to the present disclosure, a stopper 110 is configured to be fixed at a portion, which faces the protrusion portion 54 of the spring seat support arm 50, of the body frame 20, and as the protrusion portion 54 and the stopper 110 are brought into contact with each other, the spring seat support arm 50 may be restrained to be fixed.

When the protrusion portion 54 of the spring seat support arm 50 and the body frame 20 are brought into direct contact with each other without the stopper 110, due to contact between steel and steel, impact and noise are generated.

According to the present disclosure, the stopper 110 into contact with the protrusion portion 54 of the spring seat support arm 50 is an elastic pad, so the stopper 110 may induce the impact absorption and the noise prevention during the contact with the protrusion portion 54.

Figures 4A, 4B, 4C:
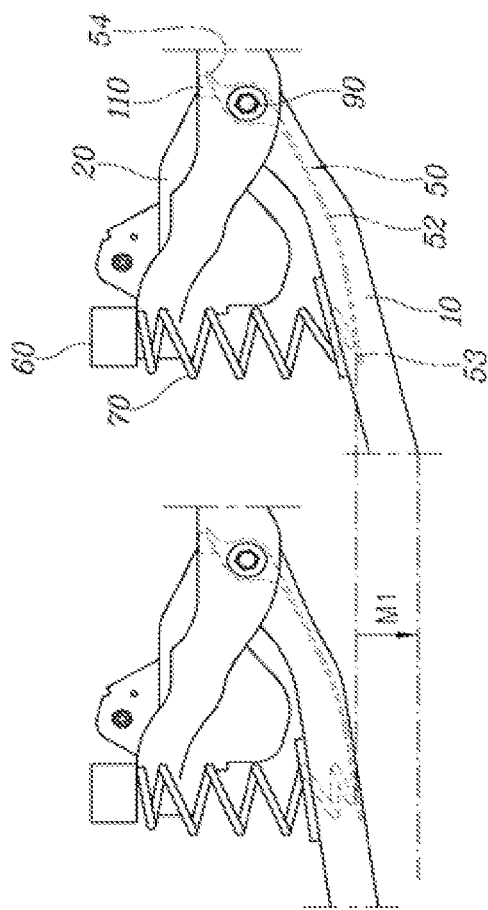

FIG. 4A shows a tolerance state, and FIG. 4B shows a full rebound state.

In the tolerance state or the normal full rebound state without departing from a range (spring freedom height) in which the spring may be tensioned, by spring force, the seat portion 53 of the spring seat support atm 50 supports the lower end of the spring 70 while being in contact with the lower end of the suspension arm 10.

Furthermore, in a normal full bump state without departing from the range (spring freedom height) in which the spring may be tensioned, by the spring force, the seat portion 53 of the spring seat support arm 50 also supports the lower end of the spring 70 while being in contact with the lower end of the suspension arm 10.

FIG. 4C shows an additional rebound state in which a rebound state is added in the full rebound state of FIG. 4B.

When a rebound state is added in the full rebound state in FIG. 4B, the suspension arm 10 further rotates counterclockwise on the bolt 90 so that the amount of downward movement increases, as shown in the drawing (arrow M1).

However, the protrusion portion 54 of the spring seat support arm 50 is brought into contact with the stopper 110 coupled to the body frame 20 so that the spring seat support arm 50 is restrained to be fixed, and the seat portion 53 is moved upward (direction toward the body member) by the elasticity of the rod portion 52 as the spring seat support arm 50 is restrained, and as a result, the seat portion 53 of the spring seat support arm 50 continuously supports the lower end of the spring 70 so that separation of the spring 70 may be prevented.

As described above, the suspension according to the embodiment of the present disclosure is configured such that the lower end of the spring 70 is continuously supported by the spring seat support arm 50 even in a situation of departing from the range (spring freedom height) in which the spring 70 may be tensioned as a rebound state is added in the full rebound state. Accordingly, the separation of the spring 70 connecting the suspension arm 10 to the body member 60 is prevented, so that safety accidents, such as a vehicle rollover accident, may be prevented, and with improvement of vehicle stability improvement of merchantability may be improved.

The embodiment of the present disclosure is configured to prevent the separation of a rear wheel spring during the full rebound state in a vehicle having a high wheel rate, such as the tuning where handling is a priority and the high performance vehicle, so rebound stroke may be additionally secured and excellent ride comfort may be secured by improving shock on impact even in the high performance vehicle.

Furthermore, the present disclosure is configured such that the lower end of the spring 70 is physically supported using the spring seat support arm 50 at a time when the vehicle reaches the full rebound state so as to prevent the separation of the spring 70. Accordingly, with the structure not affecting hardness of the spring during driving operation, the suspension may be applied without the sense of difference.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A suspension for a vehicle, the suspension comprising:
   a spring seat support arm provided at a suspension arm connecting a body frame to a knuckle; and
   a spring configured to be supported, at opposite ends of the spring, by a body member and the spring seat support arm, the body member being located above the suspension arm;
   wherein the spring seat supper arm comprises:
      a coupled portion integrally coupled to a first end of the suspension arm;
      a rod portion extending from the coupled portion along a longitudinal direction of the suspension arm and configured to be elastically deformed in response to external force;
      a seat portion provided at an end of the rod portion and configured to support a lower end of the spring; and
      a protrusion portion formed to protrude outward from the coupled portion; and
   wherein, when rebound is added in a full rebound state, as the protrusion portion is brought into contact with the body frame, the spring seat support arm is restrained to be fixed.

2. The suspension for a vehicle of claim 1, wherein the spring seat support arm is arranged along a longitudinal direction of the suspension arm and configured to have a shape of a cantilever such that a first end of the spring seat support arm is coupled to the suspension arm and the spring is supported by a second end of the spring seat support arm, the second end of the spring seat support arm corresponding to a free end of the cantilever.

3. The suspension for a vehicle of claim 1, further comprising:
   a spring pad coupled to the seat portion and configured to be in contact with the lower end of the spring.

4. The suspension for a vehicle of claim 1, further comprising:
   a stopper securely provided at a portion, the portion facing the protrusion portion, of the body frame,
   wherein, when the protrusion portion and the stopper are brought into contact with each other, the spring seat support arm is restrained to be fixed.

5. The suspension for a vehicle of claim 4, wherein the stopper is a pad made of an elastic material in order to achieve impact absorption and noise prevention during the contact between the protrusion portion and the stopper.

6. The suspension for a vehicle of claim 4, wherein the seat portion is configured such that, in a normal full rebound state without departing from a spring freedom height, the seat portion supports the lower end of the spring while being in contact with a lower end of the suspension arm by spring force; and
   when rebound is added in the full rebound state, the protrusion portion is brought into contact with the stopper so that the spring seat support arm is restrained to be fixed, and when the spring seat support arm is restrained, the seat portion is moved upward by elasticity of the rod portion to continuously support the lower end of the spring, and thereby preventing separation of the spring.

\* \* \* \* \*